United States Patent
Köhler

[11] 3,842,257
[45] Oct. 15, 1974

[54] ALTERNATING LIGHT BARRIER

[75] Inventor: Friedrich Köhler, Ulm Donau, Germany

[73] Assignee: Hans Lingl Anlagenau und Verfahrenstechnik KG, Neu-Ulm, Germany

[22] Filed: Apr. 23, 1973

[21] Appl. No.: 353,642

[30] Foreign Application Priority Data
Apr. 19, 1973 Germany.............................. 2320094
May 5, 1972 Germany.............................. 2222119

[52] U.S. Cl................. 250/206, 250/221, 250/239, 331/66, 340/258 B
[51] Int. Cl....................... G01d 21/00, G08b 13/00
[58] Field of Search ........... 250/239, 221, 222, 206; 340/258 B; 331/66

[56] References Cited
UNITED STATES PATENTS
3,214,596 10/1965 Schwerdt, Jr. et al.............. 250/239
3,697,762 10/1972 Kurtz.................................. 250/239

*Primary Examiner*—James W. Lawrence
*Assistant Examiner*—T. N. Grigsby
*Attorney, Agent, or Firm*—Cushman, Darby & Cushman

[57] ABSTRACT

An oscillator controlled by optical feedback over a light barrier path is housed with both light transmitter and light receiver in a common housing using a common light transmission/reception lens. Light reflections within the housing from the lens do not produce spurious feedback because the lens is obliquely oriented.

6 Claims, 3 Drawing Figures

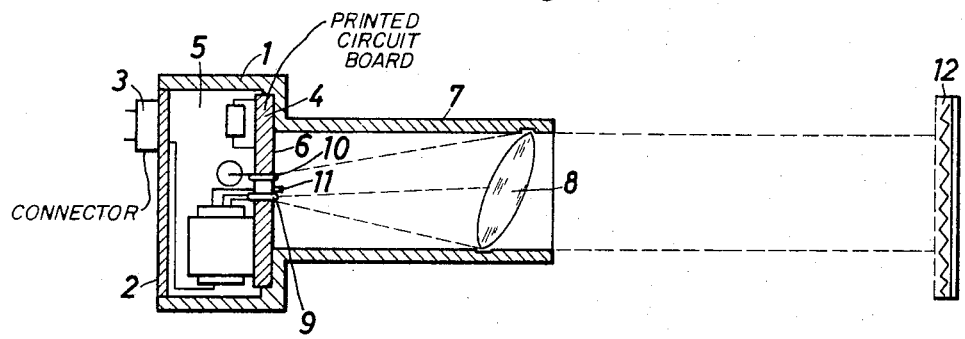
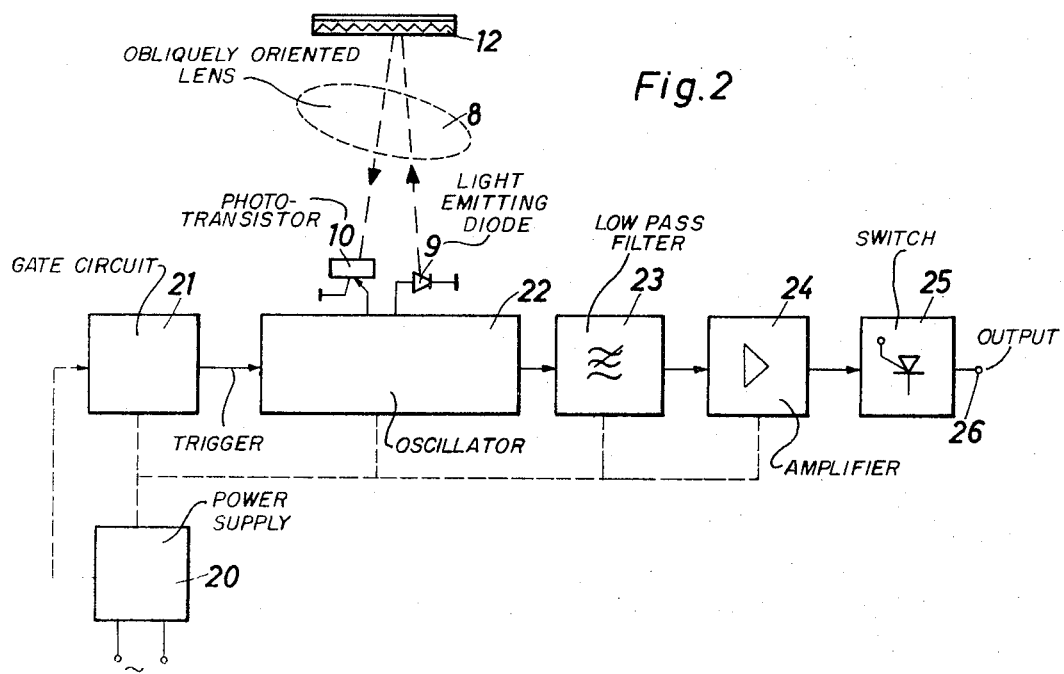

ALTERNATING LIGHT BARRIER

The present invention relates to an alternating light barrier comprising semiconductor luminescent components serving as transmitter or receiver, which components along with an associated control and receiver circuit are arranged within a casing having a lens at the light emission and re-entry side thereof. Light barriers of this type are used especially for switching, controlling and protecting purposes, for example for protecting dangerous areas in industrial plants.

There are already known light barrier systems wherein the transmitter and the receiver are housed within a common casing. Hereby the transmitter is generally a bulb, and a photo diode or a photo transistor is used as the receiver. In conventional assemblies of this type as described e.g. in the published German Pat. application No. 1,185,946 or in German Utility Models Nos. 1,883,592 or 1,929,240, measures are taken in order to obtain, on the one hand, a focussing effect of the transmitter light beams reflected by a mirror as the receiver beam, and to make sure, on the other hand, that the receiver element is uninfluenced as far as possible by the transmitter light beam or by its interface reflected radiation. However, it is known that these single-casing assemblies, frequently termed steady light barriers, may be affected by external light to great degree, and that they are not wear-resistant so that the functioning thereof can be guaranteed to limited extent only.

In order to eliminate this disadvantage, there are known light barriers which operate with modulated light. In former constructions of these so-called alternating light barriers the light beam produced by a bulb was modulated by an aperture disc driven by a synchronous motor. In more recent constructions of alternating light barriers, a light emitting semiconductor diode, generally a gallium-arsenide luminescent diode, is used as the light transmitter instead of the bulb. The light rays produced in this way can be electrically modulated up to the high-frequency range because luminescent diodes of this type operate almost without inertia. A known alternating light barrier of this type is described in the periodical "Siemens-Zeitschrift", 42, 1968, page 301 of issue 4. The high-frequency oscillator mounted within a casing separated from the receiver emits ultr-red alternating light through a gallium-arsenide diode and an optical system. The modulated light beam passes through the path to be controlled or protected and, at the end of this path, falls upon the optical system of the receiver which focusses the light beam onto the photo element positioned in the circuit of a tuned resonance amplifier. The expenditure in circuit-technical and constructional respects is relatively high since there are required a separate transmitter and a separate receiver having separate power supplies, separate casings, etc. Although it would be imaginable to house the transmitter and the receiver, as in the above-mentioned single-casing steady light barriers, in a common casing and to produce the receiver light beam by means of a reflection mirror, so that a substantial part of the double expenditure would be eliminated, tests performed in these respects resulted in systems having a pair of side-by-side disposed lenses or in systems having a lens and a deflection mirror. However, dual-lens systems suffer from the disadvantage that a predetermined minimum spacing from the reflector must be maintained. On the other hand, systems including a single lens and a deflection mirror show the disadvantage that inevitably a portion of the transmission power is reflected and affects the receiver. This applies especially to alternating light barriers which operate with luminescent diodes, i.e., which operate with relatively low transmission power. Besides, there is present the apparent disadvantage that the modulation frequency of the transmitter which produces the modulated light beam must be rather constant within a relatively narrow range in order to allow to be selectively received.

A single-casing construction for such alternating light barriers including semiconductor luminescent elements in the transmitter and receiver portions being simplified with respect to the circuitry is obtained if, in accordance with the proposal disclosed in the German Pat. application No. 1,623,778 laid open to public inspection, the transmitter and the receiver are combined into a fed back oscillator the feedback of which extends over the light path influenced by an object; that is, the radiation emitted by the semiconductor luminescent transmitter diode the control power of which is produced in the output circuit of the oscillator, in part is directed onto the photo diode disposed within the input circuit of the amplifier of the oscillator or onto a photo transistor, so that an undamped oscillation is produced by this feedback. If an object enters the light beam, the feedback is interrupted so that the oscillation of the oscillator ceases. This ON-OFF criterium can be used for the most varied control purposes.

In the above-mentioned laid-open German patent application this oscillator system comprising the feedback over the light path is described for use in measuring instruments, whereby the semiconductor transmitter and receiver elements are both mounted within a casing with a certain spacing from each other. The measuring instrument is provided with an indicating means, for example a pointer, which, when a predetermined value is reached, assumes a position exactly between the transmitter element and the receiver element and thereby interrupts the light beam so that the oscillator stops and, in this way, provides an indication that a specific limit value on the indicating instrument is reached.

Now, if one attempts to use this oscillator principle, which is known from measuring instruments, in light barriers by taking into consideration the formerly known single-casing construction, then it shows in systems having a lens and a deflecting mirror, when a lens is used the optical axis of which is positioned parallel or coaxially to the transmitter and/or receiver light beams, that because of the abovementioned, inevitable reflection on the interfaces of the lens and of the mirror the feedback condition, and thus the oscillation condition for the oscillator, can no longer be positively controlled through the light beam because of the extreme sensitivity, especially in the case of light barriers having the desired low transmitting power. On the other hand, in dual-lens systems there exists the disadvantage, likewise mentioned above, that the spacing to the reflector must be defined.

Therefore, the present invention is based upon the object of providing a ligh barrier including semiconductor luminescent components, which operates with alternating light and, thus, is insensitive to external light, which operates stably and reliably with simplified electrically and mechanically constructional structure, and which is adapted to span relatively great distances even with very small power of the emitted light beam, i.e., which is of high response in operation.

In an alternating light barrier of the type outlined at the beginning, wherein the transmitter and receiver elements are arranged in a casing and wherein a lens is provided at the light beam exit side and at the re-entry side, this object is solved according to the invention in that the optical axis of said lens is inclined, by an oblique positioning of the lens, relative to the transmitter and receiver light beams, and that at least said receiver element is situated within the receiving light beam area of said lens in a plane being not perpendicular to the optical axis of said lens.

The inventive idea of positioning the lens obliquely with respect to the transmitter and receiver light beams so that the projection area and especially the focal point in a plane extending normal to the axis of the light barrier or of the light beams are of elliptic shape, is particularly useful for alternating light barriers of low transmission power wherein the semiconductor transmitter element is disposed in the output circuit and the receiver element is placed in the input circuit of a fed back oscillator. Then, the obliquely positioned lens in advantageous manner allows to solve the problem of using with but one lens, in the arrangement of the transmitter and receiver elements in a single casing, as the feedback path the light path which is adapted to be interrupted by an external object and which extends from the transmitter element over the obliquely positioned lens to a remotely positioned reflection mirror and back through the same lens to the receiver element. Surprisingly, it has been found that even in the case of very small transmission powers, a stable oscillator is obtained due to the fact that the radiation which perhaps is refracted on the interfaces of the lens and which heretofore was reflected to the receiver element as stray radiation thereby rendering impossible a stable operation of the oscillator, is never directed to the receiver element, but rather is refracted within the lens tubes towards the inner wall or into the free space. Accordingly, interfering reflection of the transmitter and receiver portions of the oscillator is eliminated by the oblique positioning of the lens. Besides, a second lens or a deflecting mirror becomes superfluous by this lens arrangement.

The transmitter and receiver portion forming the oscillator, the network portion as well as all of the units which are required for controlling the oscillator to amplify the output signal, etc., can be readily housed within a relatively small casing and integrated into a compact electronic module by means of casting resin. In this way, the light barrier is capsuled in air-tight manner, so that it is insensitive to any ambient influences as well as to vibration and impact stresses. By using a transmitter including luminescent diodes, i.e., by the use of invisible, modulated light, the light barrier is also substantially insensitive to external light. Also, it is absolutely free from wear.

In the following, a particularly advantageous embodiment of this novel light barrier by means of which an output stage may be controlled directly by the oscillator upon rectification, is explained in greater detail by referring to the drawings, wherein:

FIG. 1 shows the basic spatial structure and the spatial arrangement in a sketch in sectional view;

FIG. 2 is a simplified block diagram of an embodiment according to the invention.

Figure 3:
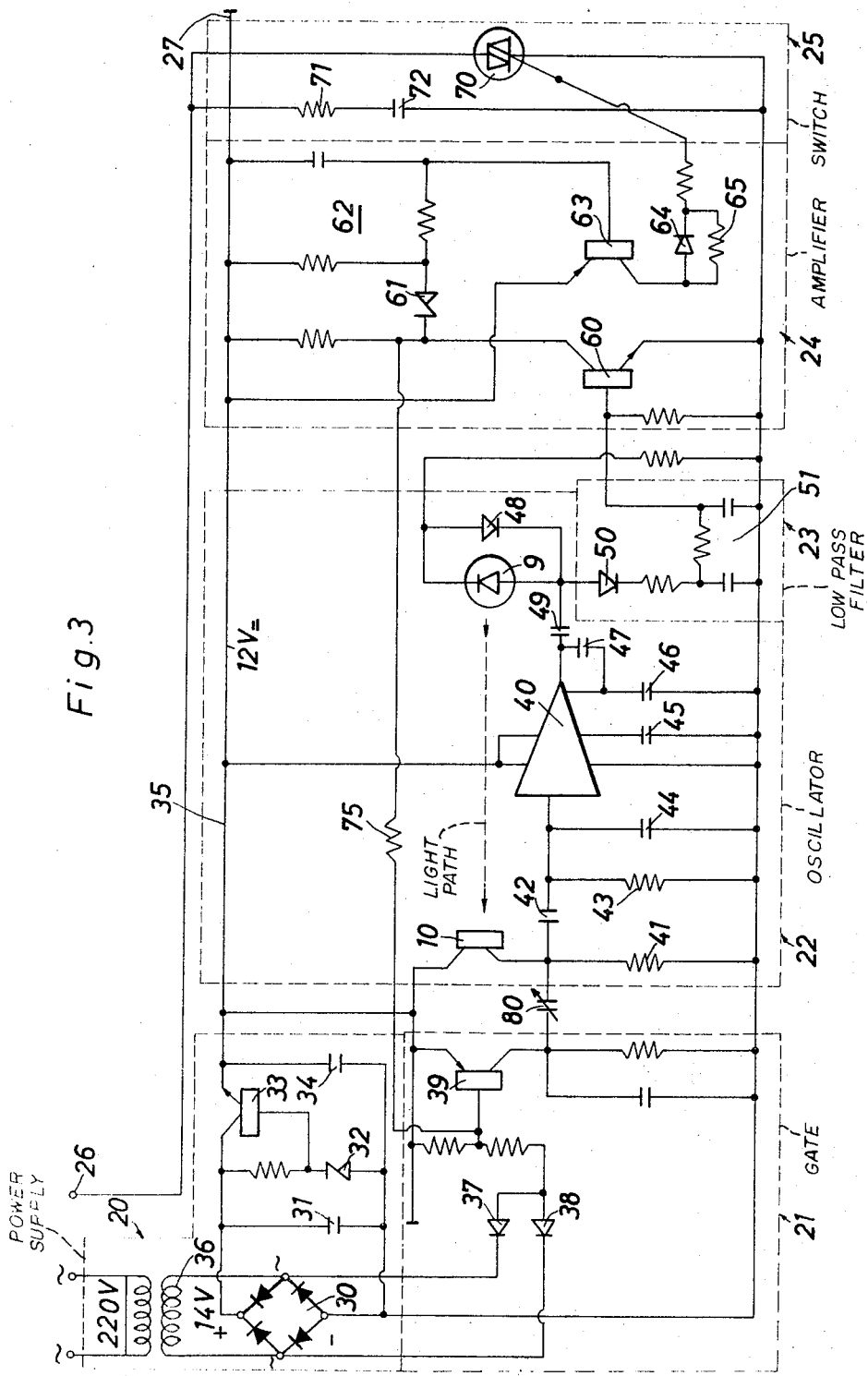
FIG. 3 shows the complete circuit of an embodiment according to the invention.

In FIG. 1, which shows an embodiment of a light barrier according to the invention in approximately one-half of its natural size, numeral 1 designates a pot-like or cup-shaped casing which on its rear side closed by a cover 2 includes several circuit connections 3 for power supply and for the switching output signal of the light barrier. At the bottom side of the casing, a circuit board, preferably a printed circuit board 4 is inserted into the casing, which board carries on the inner side 5 thereof all of the electrical components for the light barrier, such as power supply, oscillator, output stage, etc., while the conductors extend in conventional manner over the lower side of the circuit board 4. The casing 1 is integrally connected to a, preferably tubular, tubus 7 attached to the casing and which has inserted into its free outlet side a lens 8, usually a focussing lens, the optical axis of which is inclined relative to the axis of the tubus 7, i.e., the lens 8 is positioned obliquely for instance relative to the circuit board 4.

The circuit board 4 has inserted in bores provided in its center portion a gallium-arsenide luminescent diode 9 and a photo diode or a photo transistor 10 with close spacing from each other and in such a manner that their light-sensitive areas protrude slightly, i.e., by a fraction of a millimeter, over the lower side face 6 of the circuit board 4. In order to avoid a direct mutual optical interaction between the elements 9 and 10, an opaque separating platelet 11 is inserted between these two elements.

In the operation of the light barrier, the light beam emitted by the luminescent diode 9 falls onto the lens 8, is refracted and focussed thereby in the known manner and then is incident, as the transmitter light beam, on a reflection mirror 12 which, preferably, is a conventional prism mirror. The returning light beam, or rather partial light beam, falls onto the same lens 8 and is focused into the tubus 7. Evidently, the receiver light beam does not project a clear focus spot or a circular light spot, but rather an ellipse in the plane of the lower side of the circuit plate 4, i.e., where the luminescent diode 9 and the photo element 10 are positioned. Now, it has been found to be of particular advantage to effect the arrangement of the elements 9 and 10 and the oblique positioning of the lens 8 in such a manner that both of them are situated approximately in a focal point of an elliptical light beam projection produced in this way.

Provided that care is taken that no direct light passes from the luminescent diode 9 to the receiver photo element 10, this latter element, of course, may be positioned also in a plane in front of or behind the transmitter element 9, which plane is not affected by stray light in the area of this element. However, for the purposes of a rational manufacture, the illustrated and disclosed arrangement of the elements 9 and 10 in one plane on the circuit board 4 has proved to be of particular advantage.

Tests performed with the novel light barrier have shown that protection distances of up to 25 meters may be spanned even with extremely low transmission power. For practical use, the presently manufactured and tested models are recommended to be used with a spacing of from 6 to 14 meters between the transmitter/receiver unit and the reflection mirror. The light barrier operates in absolutely positive and safe manner both under ambient light conditions, for example under day-light conditions, and in complete darkness. However, in complete darkness the distance which can be bridged is shorter by about 20 percent.

FIGS. 2 and 3 show, on the one hand, the block diagram and, on the other hand, the complete construction of the circuit provided on the circuit board 4 in the interior space 5 of the casing 1. Power is supplied by an electronically stabilized mains device which, at the same time, provides the low-voltage mains frequency voltage required for the production of sampling pulses for the oscillator to a gate circuit 21 which triggers the oscillator 22. The pulseshaped alternating output signal of the oscillator 22 is directed through a low-pass filter 23 for removing A.D. frequency portions resulting from the sampling pulse, whereby the output signal of said filter is amplified in the amplifier 24 and thereafter triggers a controllable semiconductor switching element 25, for example a triac, which provides at a terminal 26 the switching output signal of the light barrier.

The circuit is shown in detail in FIG. 3. It is apparent to the expert without any further explanation that the pulsating D.C. voltage produced by the full-wave rectifier 30 is electronically stabilized by the capacitor 31, the Zener diode 32 and the transistor 33 controlled by the Zener diode, as well as by the further smoothing capacitor 34. The pulsating D.C. voltage taken from the rectifier 30 amounts to about 14 volts, while the stabilized D.C. voltage on the line 35 is adjusted to about 12 volts. This voltage value corresponds approximately to the break-through voltage of the Zener diode 32. The terminals of the rectifier 30 which are connected to the low-voltage winding of the transformer 36 have connected thereto at the input side of the gate circuit 21 a pair of diodes 37 and 38 through which a supply-frequency sampling pulse is obtained which temporarily blocks a transistor 39 which is normally switched into the current conducting mode, such that a voltage pulse is produced at the output, i.e. at the collector of this transistor which is connected to the input of the oscillator 22 via a very small adjustable coupling capacitor 80 which, for instance, may consist merely of a pair of wires adapted to be slightly twisted relative to each other. This voltage pulse determines the sampling sequence for the oscillator 22. The oscillator 22 comprises essentially an integrated amplifier element 40, e.g. an operation amplifier which has in the input circuit thereof the receiver-side photo element 10, a photo transistor in the illustrated example, and which as inserted into the output circuit thereof the light transmitter, i.e., a luminescent diode 9 in the present case. The elements 41, 42, 43, 44, 45 and 46 serve, in known manner, for the adjustment of the operating point or for the suppression of undesired oscillations, respectively. The capacitor 46 connected from the output of the amplifier 40 to the blocking capacitor 47 serves a damping function in order to ensure that the oscillator oscillates below a predetermined frequency. Since the amplifier provides an A.C. voltage signal, a further, normal diode 48 is connected in anti-parallel fashion to the luminescent diode, in order to suppress the second half-wave. The coupling of the transmitter-side luminescent diode 9 as well as the coupling out of the signal from the oscillator 22 are effected through a capacitor 49.

From the capacitor 49, the useful output signal of the oscillator is applied to the filter 23 wherein, at first, a rectification through the diode 50 is performed at the input side. In the $\pi$-filter element 51, the rectified signal is then smoothed before it is applied to the amplifier 24 the input stage of which comprises a transistor 60 connected in emitter-base connection. The signal amplified by the transistor 60 is connected to the input of the terminal stage transistor 63 at the collector via a Zener diode which defines a specific switching threshold value for the terminal stage of the amplifier 24, after a repeated smoothing by an RC member 62. From the output of the transistor 60, a feedback via a resistor 75 of about 100 kilo ohms is effected to the input of the transistor 39 which, with the oscillator 22 activated, remains inhibited by the feedback signal. The output of the collector of the transistor 63 is connected to the control electrode of a triac 70 in the stage 25 with the interposition of a luminescent diode 64 which, for reasons of functional safeness of the light barrier even in the case of failure of this diode 64, is shunted via a resistor 65. The load path of the triac 70 which is shunted by the series combination of a resistor 71 and a capacitor 72 for protection against overload, represents the switched control path of the light barrier which may be loaded with, for example, 200 watts and the one output point of which is formed by the connection 26 which with respect to the potential is referenced e.g. to ground 27.

The present circuit operates as follows:

Through the mains or supply portion 20, there is produced, on the one hand, a stabilized D.C. voltage of about 12 volts (line 35) generated in known manner, and, on the other hand, the oscillator 22 is sampled via the diodes 37 and 38 and the switch (transistor) 39. Provided that the light path from the luminescent diode 9 through the optical system 8 and the mirror 12 to the photo transistor 10 is closed and not interruped by an object intruding this "barrier", the oscillator 22 being fed back in this way by the light beam, upon being triggered by the sampling pulse, will oscillate at a relatively high frequency determined essentially by the capacitances of its active circuit. Hereby, the light transmitter (the luminescent diode 9) converts one-half wave only of the incoming oscillations into light energy, while the other half-wave is suppressed by the diode 48. The output signal of the oscillator is then rectified and filtered in the stage 23, amplified in the amplifier 24 and utilized for controlling the output-side triac 70 in dependency of a specific threshold value.

I claim:

1. An alternating light barrier apparatus comprising:

a housing having an aperture for light rays to exit from and enter into, a light transmitter means within said housing for converting electrical energy into light rays.

a light receiver means within said housing for converting light rays into electrical energy, electrical oscillator means within said housing having an output electrically connected to said light transmitter means and an input electrically connected to said light receiver means to thereby control the presence or absence of electrical oscillatory signals at the oscillator output in dependence upon the presence or absence respectively of a predetermined amount of light feedback from said light transmitter to said light receiver, said light transmitter means and said light receiver means being disposed side-by-side in a common plane within said housing at a predetermined distance behind said aperture, a separating platelet disposed between said light transmitting means and said light receiving means to prevent direct light feedback therebetween, and a lens obliquely disposed within said aperture for transmitting light therefrom and for receiving light thereinto, said obliquely disposed lens being inclined sufficiently to define an elliptical focal area at said common plane which elliptical focal area encompasses both said light transmitter means and said light receiver means thereby insuring that an external reflection of the transmitted light will fall upon the light receiver means while at the same time insuring that an internal reflection of the transmitted light will be harmlessly deflected away from the light receiver means.

2. An alternating light barrier apparatus as in claim 1 wherein said aperture comprises a tubular portion of said housing.

3. An alternating light barrier apparatus as in claim 1 wherein said common plane comprises an electrical printed circuit board on which the light transmitter means, the light receiver means and the electrical oscillator means are mounted and electrically connected.

4. An alternating light barrier apparatus as in claim 1 further comprising an electrical switch means within said housing and electrically connected to and controlled by the output of said electrical oscillator means and wherein said electrical switch means is connected to an external output connector for, in turn, controlling an external electrical circuit.

5. An alternating light barrier apparatus as in claim 1 further comprising:

a gate circuit means within said housing and electrically connected to the input of said electrical oscillator means for periodically triggering said oscillator means into oscillation if sufficient light feedback is present.

6. An alternating light barrier apparatus comprsing semiconductor components serving as a light transmitter and a light receiver, which components along with an associated control and receiver circuit are arranged within a casing having a single lens at a light emission and re-entry side thereof, said apparatus characterized in that:

the optical axis of said lens is inclined, by an oblique positioning of the lens, relative to transmitter and receiver light beams, and at least said receiver is situated within the receiving light beam area of said lens in a plane which is at an oblique angle to the optical axis of said lens, said transmitter and said receiver are arranged in side-by-side relation in said plane inclined at an oblique angle relative to the optical axis of said lens, said plane in which said transmitter and receiver are arranged comprises a printed circuit board, the soldered side of which is directed towards the lens, and said transmitter and said receiver are inserted into bores of the circuit board from the mounting side thereof in such a way that the light-emitting and light-sensitive areas thereof respectively are situated substantially in the plane of the soldered side of the printed circuit board.

* * * * *

UNITED STATES PATENT OFFICE
CERTIFICATE OF CORRECTION

Patent No. 3,842,257      Dated  October 15, 1974

Inventor(s) Friedrich Kohler

It is certified that error appears in the above-identified patent and that said Letters Patent are hereby corrected as shown below:

Cover page, data item [73], change "Anlagenau" to --Anlagenbau-- so as to correct the spelling of the assignee;

Column 1, line 46, change "ultr" to --ultra--;

Column 5, line 17, change "A.D." to --A.C.--; and

Column 8, line 10, change "comprsing" to --comprising--.

Signed and sealed this 18th day of February 1975.

(SEAL)
Attest:

RUTH C. MASON
Attesting Officer

C. MARSHALL DANN
Commissioner of Patents
and Trademarks